US006608949B2

United States Patent
Kim et al.

(10) Patent No.: US 6,608,949 B2
(45) Date of Patent: Aug. 19, 2003

(54) OPTICAL OSCILLATOR WITH MILIMETERWAVE FREQUENCY

(75) Inventors: Ho Young Kim, Daejon-Shi (KR); Kwang Yong Kang, Daejon-Shi (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/185,102

(22) Filed: Jun. 27, 2002

(65) Prior Publication Data

US 2003/0138196 A1 Jul. 24, 2003

(30) Foreign Application Priority Data

Jan. 22, 2002 (KR) .......................................... 2002-3529

(51) Int. Cl.$^7$ ................................................ G02B 6/26
(52) U.S. Cl. .............................. 385/27; 385/147; 372/6
(58) Field of Search ............................ 385/16–30, 147, 385/15, 39, 127; 372/6, 69, 20, 25; 356/350, 345; 375/6

(56) References Cited

U.S. PATENT DOCUMENTS

| 5,140,599 A | * | 8/1992 | Trutna et al. .................. 372/20 |
| 5,263,037 A | * | 11/1993 | Trutna et al. .................. 372/20 |
| 5,835,260 A | * | 11/1998 | Kosaka et al. .......... 359/341.41 |
| 5,917,969 A | | 6/1999 | Gavrilovic et al. |
| 5,943,162 A | * | 8/1999 | Kosaka et al. .......... 359/341.31 |
| 6,072,813 A | * | 6/2000 | Tournois ....................... 372/25 |
| 6,134,250 A | | 10/2000 | Korean et al. |
| H1926 H | | 12/2000 | Carruthers et al. |

OTHER PUBLICATIONS

IEICE Trans. Electron., vol. E84 C, No. 10 Oct. 2001, "GaN–Based Gunn Diodes: Their Frequency and Power Performance and Experimental Considerations", E. Alekseev, et al., 8 pages.

IEEE Photonics Technology Letters, vol. 2, Feb. 1995, "Performance Characterization of a Harmonically Mode–Locked Erbium Fiber Ring Laser", J. Wey, et al., 5 pages.

ECOC 1998, Sep. 20–24, 1998, "20 GHz Bandwidth of Lasers Flip–Chip–Mounted on Microstructured Carriers with Integrated Electrical Waveguides", H. Ahlfeldt, et al., 2 pages.

* cited by examiner

Primary Examiner—Akm E. Ullah
(74) Attorney, Agent, or Firm—Blakely, Sokoloff, Taylor & Zafman

(57) ABSTRACT

The present invention relates to an optical oscillator with milimeterwave frequency. The optical oscillator comprises a non-linear circuit including a wavelength coupler for receiving a pump light, an optical amplification optical fiber for amplifying the light from the wavelength coupler, a dispersion-compensating optical fiber for obtaining a non-linear polarizing effect of the light transmitted via the optical amplification optical fiber, a line polarizer for varying the wavelength of the light having a non-linear polarizing effect by means of the dispersion-compensating optical fiber, and a polarizing controller for controlling the modulating frequency of the light transmitted via the line polarizer; an output circuit having an optical direction indicator for precluding the path of the light, a 10% optical fiber coupler for output light, and a dispersion-compensating optical fiber for determining the wavelength region; and an optical coupler for connecting the, non-linear circuit and the output circuit. Therefore, two laser modes are simultaneously oscillated so that ultra-high frequencies(60, 120 and 160 GHz) are modulated due to Magnolia phenomenon between the two laser modes.

2 Claims, 3 Drawing Sheets

OPTICAL OSCILLATOR WITH MILIMETERWAVE FREQUENCY

BACKGROUND OF THE INVENTION

1. Field of the Invention

The invention relates generally to an optical oscillator with milimeterwave frequency. More particularly, it relates to an optical oscillator with milimeterwave frequency having a 8-character shape optical fiber resonator structure in which a line polarizer is inserted so that the non-linear property of the 8-character shape optical fiber resonator can be employed with a specific modification of a ring type optical fiber resonator, whereby two laser modes are modulated to be an ultra-high frequency of 60, 120 and 160 GHz due to Magnolia phenomenon between the two laser modes.

2. Description of the Prior Art

In the milimeterwave communication system which has a large information capacity for four-generation wireless internet service, a method of using a semiconductor high frequency optical modulator and a modulation method of a resonator itself has been proposed for recent 5~6 years, as a method of connecting a milimeterwave oscillator to the base stations.

In the optical modulator mode, however, the frequency region is limited to up to 30 GHz, the maximum. And the modulating method employs the optical fiber resonator of a dual ring structure of 40 GHz region shown in FIG. 1.

FIG. 1 shows a frequency variable laser source having a dual ring type resonator structure. One of the two ring type resonators includes a WDM coupler 10 for coupling the pump light of 980 nm, an optical amplification optical fiber (LAF) 10 of 10 m for amplifying the light, a dispersion-compensating optical fiber 12 20 m for a non-linear polarizing effect, an optical direction indicator 13, and a first polarization controller 14. The other of the two-ring type resonator includes a dispersion-compensating optical fiber 18 of 15 m for a non-linear polarization effect, and a second polarization controller 16. These ring type resonators are coupled by the optical fiber coupler and produces an output light by means of a 10% coupler.

SUMMARY OF THE INVENTION

The present invention is contrived to solve the above problems and an object of the present invention is to provide a good optical oscillator having a high modulating frequency of 60, 120 and 160 GHz that could not be produced through commercial components.

Another object of the present invention is to provide a high frequency laser optical oscillator having a simple structure without using expensive components such as an optical modulator.

Laser is oscillated in a wavelength in which the gain is maximized during one period of resonance within a single laser resonator. In an 8-character shape optical fiber resonator, a factor of determining the gain further includes a non-linear characteristic generated at an asymmetric optical path as well as the gain at the optical amplification medium and a birefringence phenomenon against the polarization mode of a laser existing within the optical fiber. Due to the non-linear phenomenon, an ultra-short wave pulse, wavelength variable continuous light source and ultra-high frequency modulated light source in which their characteristics of the light source are below 1 ps can be fabricated depending on the structure of the optical components. In the present invention, a line polarizer is inserted into an 8 character shape optical fiber resonator in which a single ring type resonator is divided into two circuits by dividing it into a 50% optical fiber coupler in order to oscillate the laser mode in dual. Thus, a laser light source that is modulated to be an ultra-high frequency of 60, 120 and 160 GHz by means of Magnolia phenomenon between the two laser modes can be provided The present invention employs a phenomenon in which two lights separately outputted from the coupler of the linear circuit and the non-linear circuit are experienced by different refractive index that exist asymmetrically. Under special conditions that are selected by the line polarizer into which a light source oscillating in a single mode is inserted. In case that the linear polarizer does not exist, the dual mode satisfying the two resonating conditions are oscillated so that a modulated frequency high frequency laser is produced. Further, the modulating frequency of laser oscillated by the polarizing controller is converted into two types using the specific condition depends on the refractive index.

An optical oscillator with milimeterwave frequency according to the present invention is characterized in that it comprises a wavelength coupler for receiving a pump light, an optical amplification optical fiber for amplifying the light from the wavelength coupler, a dispersion-compensating optical fiber for obtaining a non-linear polarizing effect of the light transmitted via the optical amplification optical fiber, a line polarizer for varying the wavelength of the light having a non-linear polarizing effect by means of the dispersion-compensating optical fiber, and a polarizing controller for controlling the modulating frequency of the light transmitted via the line polarizer; an output circuit having an optical direction indicator for precluding the path of the light, a 10% optical fiber coupler for output light, and a dispersion-compensating optical fiber for determining the wavelength region; and an optical coupler for connecting the non-linear circuit and the output circuit.

BRIEF DESCRIPTION OF THE DRAWINGS

The aforementioned aspects and other features of the present invention will be explained in the following description, taken in conjunction with the accompanying drawings, wherein:

FIG. 3 shows a gain obtained from variations in the polarizing controller depending on light in the optical fiber resonator.

DETAILED DESCRIPTION OF PREFERRED EMBODIMENTS

The present invention will be described in detail by way of a preferred embodiment with reference to accompanying drawings.

Figure 2:
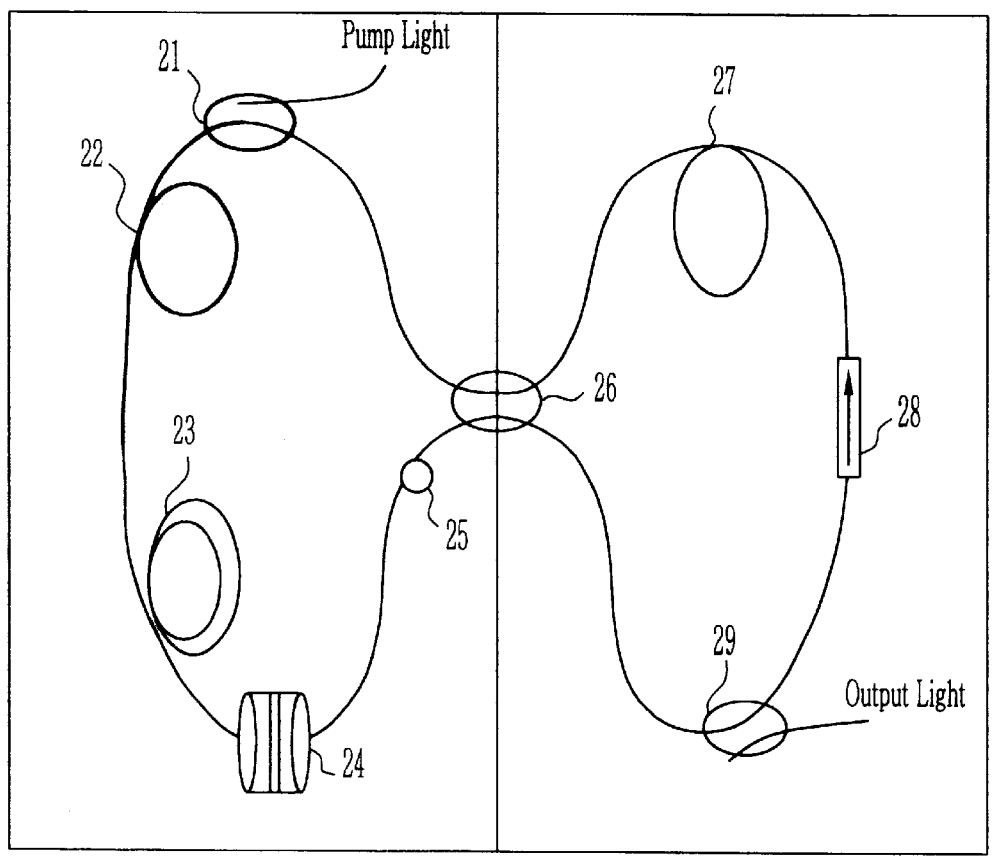
FIG. 2 is a schematic diagram of an optical oscillator with millimeterwave frequency having a 8-character shape according to the present invention.

FIG. 2 is a schematic diagram of an optical oscillator with millimeterwave frequency having an 8-character shape according to the embodiment. The optical oscillator includes a non-linear circuit, an output circuit and a 50% coupler positioned between the non-linear circuit and the two circuits. The non-linear circuit comprises a wavelength coupler 21 for receiving the pump light, an optical amplification fiber (Er) 22 of 10 m for amplifying the light from the wavelength coupler, a dispersion-compensating optical fiber 23 of 20 m for making of the light transmitted through the optical amplification optical fiber 22 a non-linear polarized, a line polarizer 24 mounted on an optical fiber focusing lens system for varying the wavelength of the light having a non-linear polarizing effect by means of the dispersion-compensating optical fiber, and a polarization controller 25 for controlling the modulation frequency of light transmitted through the line polarizer.

Further, the output circuit comprises an optical direction indicator 28 for intercepting the path of light, a 10% optical fiber coupler 29 for outputting light, and a dispersion-compensating optical fiber 27 of 15 m for determining the wavelength region. Two circuits are coupled by a 2×2 optical fiber coupler 26 of a 50% coupling ratio to form an 8-character shape in total structure. A laser diode of 980 nm is used as pumping of light and the pumped light is inputted to one terminal of the optical amplification optical fiber 22.

The light outputted from the wavelength coupler 29 pass through the optical direction indicator 28 and the dispersion-compensating optical fiber 27 of 15 m and the light is inputted to the non-linear circuit. At this case, the light is divided into two lights and then passes through the non-linear circuit. The light of a clockwise direction first passes through the optical amplification optical fiber 22. Therefore, the light passes through the dispersion-compensating optical fiber 23 with the power of the amplified light. On the contrary, the light of a counterclockwise direction passes through the dispersion-compensating optical fiber 23 with relatively low optical power. Therefore, the phase difference between the polarization axes by the non-linear phenomenon is increased. Because of the difference of direction toward which each of two lights travel, a total birefringence within the optical fiber has a difference. Each lights of two paths experience the difference of birefringence but have rarely difference in the optical power are converged at the input end of the output circuit.

If one polarization mode is not selected (if there is no linear polarizer), the phase difference due to the experienced birefringence is very minute (in case that the non-linear phase difference of the output light is small enough to be 0.1 degree). At this case, the lights will temporarily be modulated and the lights will be cancelled.

On the contrary, If there is no external changes while passing the output circuit, the laser light will be oscillated in a single mode of a wavelength that is determined in the total birefringence within the resonator. If there exists the line polarizer in the non-linear circuit, however, only one type of the polarization mode is selected. Thus, the birefringence of the polarization mode will not be cancelled, only unique polarization state remains, so that the amplified light is continuously produced as a laser.

Other polarization modes intercepted in the linear polarizer are reflected back and then passes through the optical amplification optical fiber so that it goes and returns the resonator. Therefore, the phase difference of lights becomes larger. The original state of the polarization mode has a resonance frequency (wavelength). As two modes exist within the resonator, the light having modulated optical power depending on the difference in the frequency between the modes is naturally oscillated. In case that the total gain of the birefringence is adequate due to wide widths of gain, the several types of the polarization modes may exist. Further, several modulation frequency can coexist. If the polarization modes are selected by controlling the polarizing controller, a light of a desired modulation frequency can be obtained.

Figure 4:
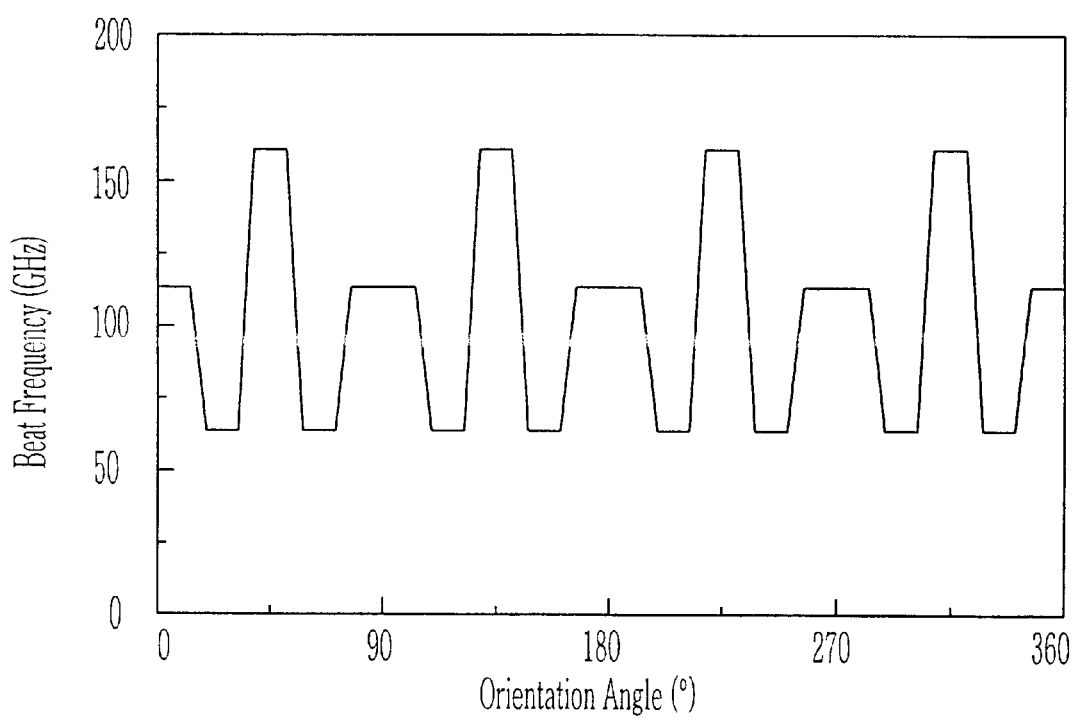
FIG. 4 shows a characteristic in which the modulating frequency of laser is varied depending on variations in its angle.
Figure 4:
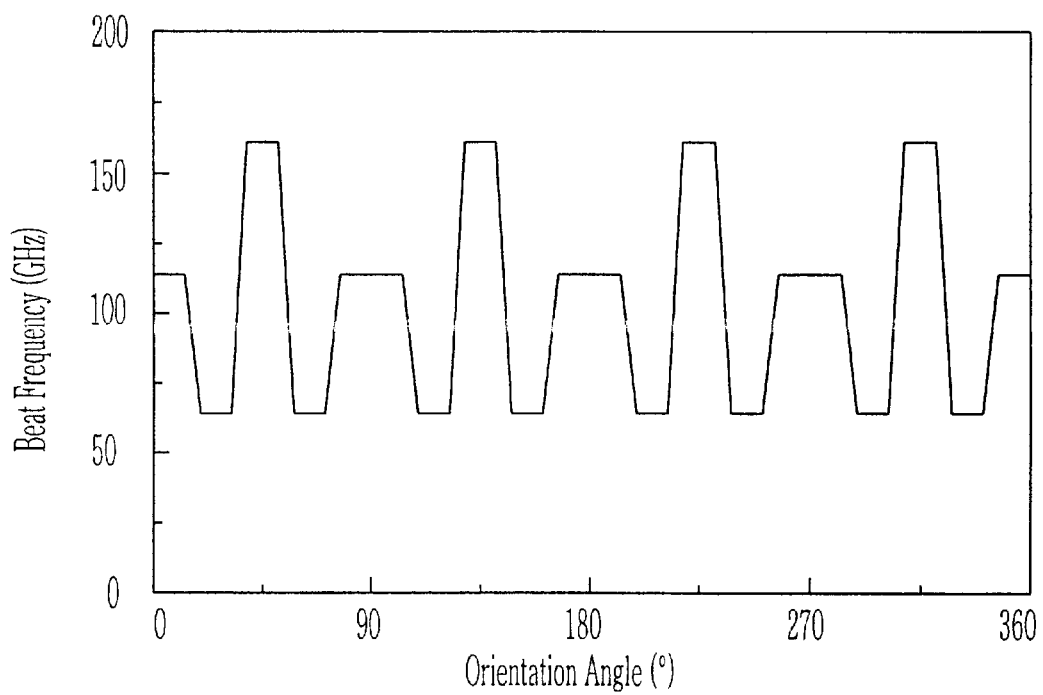

The modulating frequency selected in the embodiment is 60 GHz band. It can be seen that the gain of the resonator against the orientation angle of the polarization controller is varied for the wavelength of the output wavelength as in the three-dimensional graph in FIG. 3, in case that the length of the non-linear circuit is 20 m, the length of the output circuit is 15 m and the pump light is 50 mW. Further, modulation frequency(beat frequency) of the optical power depending on the maximum gain, 60, 120 and 160 GHz are periodically changed against the orientation angle of the polarization controller in FIG. 4. Here, L1 and L2 are the lengths of dispersion-compensating optical film 27 and dispersion-compensating optical film 23, respectively.

Figure 1:
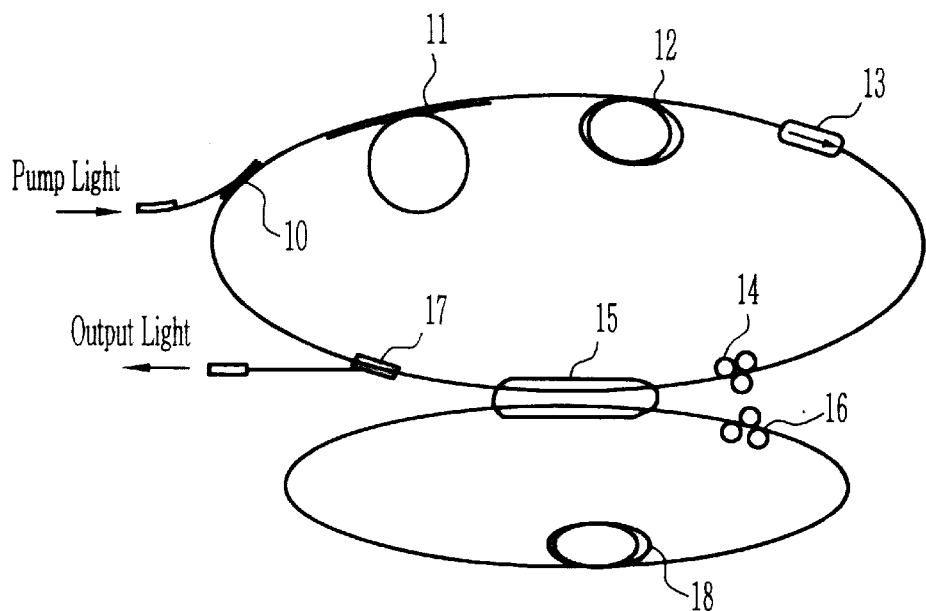
FIG. 1 is a schematic diagram of a frequency variable laser source having a dual ring type resonator structure.

By adding a linear polarizer to the resonator of the structure shown in FIG. 1, the phase variation due to the birefringence may become larger since the path of lights experienced by other polarization mode is extended twice. The difference in the resonance frequency between modes may become larger. The difference in the resonance frequency is the modulation frequency of the optical power and ultra-high frequencies of 60, 120 and 160 GHz in the milimeterwave band can be made.

As mentioned above, a high frequency optical oscillator can be obtained, in which a modulation frequency of laser generated is varied at the frequency of 60, 120 and 160 GHz by adjusting the polarization controller, according to the present invention. Due to this, the present invention has an outstanding advantage that the construction is simple and the manufacturing cost is low without requiring a conventional expensive optical modulator. The optical oscillator for varying modulation frequency is applicable to milimeterwave generator for ultra-high wireless internet service. Further, the optical oscillator is applicable to a key component of the wire ultra-high optical transmission system.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. An optical oscillator with milimeterwave frequency, comprising:

a non-linear circuit including a wavelength coupler for receiving a pump light, an optical amplification optical fiber for amplifying the light from the wavelength coupler, a dispersion-compensating optical fiber for obtaining a non-linear polarization effect of the light transmitted via the optical amplification optical fiber, a line polarizer for varying the wavelength of the light having a non-linear polarization effect by means of the dispersion-compensating optical fiber, and a polarization controller for controlling the modulating frequency of the light transmitted via the line polarizer;

an output circuit having an optical direction indicator for precluding the path of the light, a 10% optical fiber coupler for output light, and a dispersion-compensating optical fiber for determining the wavelength region; and an optical coupler for connecting the non-linear circuit and the output circuit.

2. The optical oscillator with milimeterwave frequency as claimed in claim 1, wherein said optical fiber coupler has a 50% coupling ratio.

* * * * *